United States Patent [19]

Miyazaki

[11] Patent Number: 5,075,706
[45] Date of Patent: Dec. 24, 1991

[54] ACCESSORY SHOE ADAPTER FOR VIDEO CAMERA

[75] Inventor: Kiyoshi Miyazaki, Tokyo, Japan
[73] Assignee: Kabushiki Kaisha LPL, Higashimurayama, Japan
[21] Appl. No.: 630,160
[22] Filed: Dec. 19, 1990
[30] Foreign Application Priority Data Jun. 29, 1990 [JP] Japan .............................. 2-69068[U]

[51] Int. Cl.$^5$ ............................................ G03B 15/02
[52] U.S. Cl. .................................. 354/126; 354/288; 358/906
[58] Field of Search ........................... 354/126–149.11, 354/288; 358/906

[56] References Cited

U.S. PATENT DOCUMENTS 4,924,246  5/1990  Yamada .............................. 354/126

Primary Examiner—L. T. Hix
Assistant Examiner—David M. Gray
Attorney, Agent, or Firm—Christie, Parker & Hale

[57] ABSTRACT

An accessory shoe adapter is provided for video cameras having a battery pack mount with a pair of contacts adapted to receive a battery pack to power the camera. The adapter comprises an adapter body having a front and a rear and includes a shoe portion for mounting an accessory; a camera mount formed on the front of the adapter body and adapted to be mounted on the battery pack mount of the video camera; and a battery pack mount formed on the rear of the adapter body and adapted to receive the battery pack. A first pair of electric contacts is provided in the shoe portion, a second pair of electric contacts is provided on the camera mount of the adapter body corresponding to the electric contacts provided on the battery pack mount of the video camera, and a third pair of electric contacts is provided on the battery pack mount of the adapter body at locations corresponding to the second pair of electric contacts on the adapter body camera mount. The second and third pairs of electric contacts on the adapter body are interconnected, as are the first pair of electric contacts in the shoe portion and the third pair of electric contacts on the adapter body battery pack mount. The adapter is engaged to the video camera by mounting the adapter body camera mount on the video camera battery pack mount, and a battery pack is installed by engaging its contacts with the adapter body battery pack mount. Because of the interconnection between the first and third pairs of adapter body electric contacts, the same battery pack may also be used to power an accessory mounted in the shoe portion of the adapter.

9 Claims, 3 Drawing Sheets

ACCESSORY SHOE ADAPTER FOR VIDEO CAMERA

BACKGROUND OF THE INVENTION

Conventionally, accessories for a video camera, such as a light unit, a microphone and a liquid crystal monitor, have been used and put into operation by means of a supply source of an external power source, e.g., a portable battery pack or a stationary electrical outlet, via an electrical cord or wire, or interchangeable batteries housed in each accessory. Usually, the accessory is mounted on a shoe attached to the video camera body. Thus, with the use of electric current supplied from the external power source, some inconveniences, such as entanglement of the electric cord, were caused during picture-taking operation. On the other hand, the accessory which houses the supply source (batteries) therein, and which has been used to avoid the aforementioned inconveniences, is inconvenient for other reasons. The batteries of the video camera body and the batteries of the accessory in use are provided separately from each other, and, accordingly, power consumption by the video camera body and that of the accessory are different, thereby resulting in different lengths of life of the batteries, which, in turn, requires that the batteries in the video camera body and those in the accessory be changed separately and at different times. Further, housing of batteries inside the accessory provides a certain limitation to make the accessory a smaller size, due to the space required for containing the batteries.

The object of the present invention is to provide an adapter for mounting the accessory for the video camera, which eliminates the above-mentioned inconveniences and drawbacks in handling the accessory. Specifically, the present invention provides an accessory shoe adapter for the video camera which allows the video camera and the accessory to share a common supply source.

SUMMARY OF THE INVENTION

The adapter of the present invention utilizes the battery pack mount of the video camera body and comprises a shoe portion which carries electric contacts and which is formed at the head of the adapter body. The said adapter body is formed on its front and rear sides with a camera mount and a battery pack mount, respectively. The adapter mounts are configured in a mutually complementary relationship.

According to the present invention, instead of mounting the battery pack directly on the battery-pack mount of the video camera body, the camera mount of the adapter body of this invention is mounted on the battery-pack mount of the video camera body, and the battery pack is mounted on the battery-pack mount provided on the other side of the adapter body. Electric contacts corresponding to the electric contacts in the battery-pack mount of the video camera are provided in the camera mount of the adapter, and corresponding electric contacts are provided in the battery-pack mount of the adapter body. These electric contacts on both the battery-pack mount and the camera mount of the adapter body are electrically connected. Further, the electric contacts in the battery-pack mount of the adapter body and the electric contacts in the shoe portion are also electrically connected.

The electric contacts in the shoe portion are preferably located at a level lower than the surface where the accessory engages with the shoe portion.

Moreover, the adapter body of the present invention includes a battery protection mechanism through which the electric contacts in the battery-pack mount of the adapter and the electric contacts in the shoe portion are electrically connected.

The accessory shoe adapter of this invention is constructed so that the camera mount of the adapter body is attached to the battery pack mount of the video camera and then the battery pack is mounted on the battery pack mount of the adapter body. Accordingly, the device of the invention can be attached to or removed from the video camera with one touch, just as when the battery pack is mounted on or removed from the video camera.

With the present invention, the shoe portion including the electric contacts is provided at the head of the adapter body, and if the accessory to be used is also provided with electric contacts, the same supply source (battery pack) can be used by both the video camera and the mounted accessory. It should be noted that, even if an accessory having no electric contacts is mounted, there will be no short circuit, because the electric contacts in the shoe portion are located at a level lower than the surface where the accessory engages with the shoe portion.

Also, the shoe portion is configured so that an accessory can be mounted easily with one touch.

Furthermore, the contacts in the camera mount of the adapter and the contacts in the battery pack mount of the adapter, which are interconnected, are at corresponding locations on the front and rear sides of the adapter, respectively. This feature of the invention allows for use of commercially available battery packs which are intended exclusively for video cameras.

DETAILED DESCRIPTION

Figures 1, 2, 3:
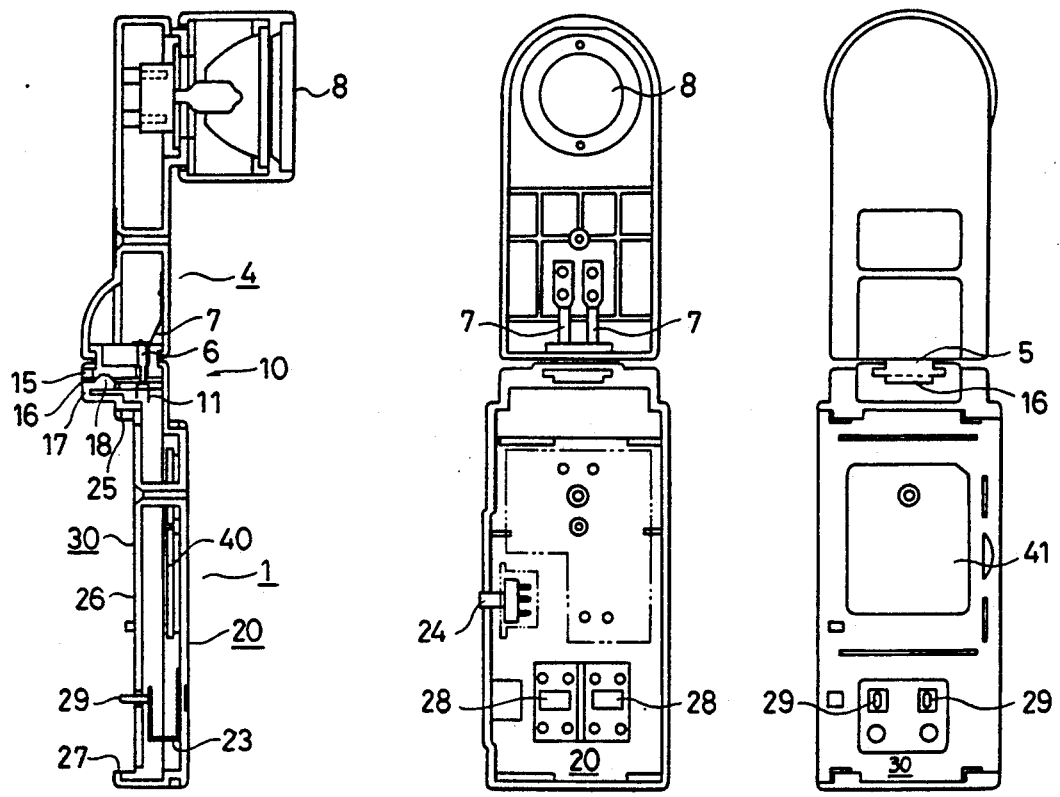
FIG. 1 is a sectional side view showing a preferred embodiment of the adapter of the present invention with an accessory, shown as a light unit, mounted thereon.
FIG. 2 is a rear view of the adapter of the present invention showing a configuration of the side of the adapter which will be mounted on the battery pack mount of the video camera.
FIG. 3 is a front view of the adapter of the present invention showing a configuration of the side of the device to which a battery pack is mounted.

Referring to FIG. 1, the adapter body 1 comprises a shoe portion 10 including a dovetailed portion 15 to which an accessory, such as a video light unit, a microphone, or a liquid crystal monitor, can be attached. A video light unit 4, for example, can be attached by fitting the convex portion formed at the bottom of the light unit 4 into the dovetail 15 and sliding the light unit forward and backward with respect to the dovetail 15. The adapter body 1 includes a camera mount 20 to be mounted on a video camera, and a battery pack mount 30, opposite said camera mount 20. The camera mount 20 is configured so as to fit into a battery pack mount (not shown) of a commercially available video camera body, the place where otherwise a battery pack would be mounted. The battery pack mount 30 is configured so that the battery pack for the video camera body can be mounted thereon.

The shoe portion 10 is formed at the head of the adapter body 1, as shown in FIGS. 1-5B. The shoe portion 10 includes the dovetail 15 to which the convex portion 5 at the bottom of the video light unit 4 can be fitted; two pairs of holes 12 which pass vertically from above to below, through the surface of a guide groove 16 provided in the bottom of the dovetail 15, which also serves as the upper wall surface of the adapter 1; inverted U-shaped electric contacts 11 respectively provided through said holes 12; and a spring 17 having a resilient projection 18 which is formed by making an incision in an upper end guide 25 to form the shape corresponding with the shape of the guide groove 16 located in the inner wall of an upwardly facing step 17 and by turning said incised shape inwardly. The shoe portion is dimensioned according to the Japanese Industrial Standard.

The dovetail 15 is arranged at the center of the head of the adapter 1 from the rear side towards the front, terminates at an edge 13 of the adapter, and includes the guide groove 16. The pairs of holes 12 are formed in the guide groove 16 between the center of the dovetail 15 and the forward end thereof. In contrast, the projection 18 of the spring 17 is located between the center of the dovetail 15 and the rear end thereof. In the disclosed embodiment the spring 17 is formed integrally with the adapter body 1. However, the spring may also be made separately and fixed to the inner wall of the adapter body 1. In that case, the spring is preferably made of a resilient metal or an easily formed synthetic material.

Figure 4:
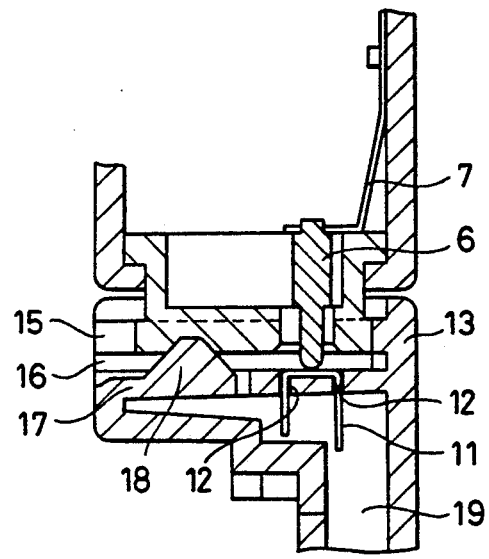
FIG. 4 is an enlarged, sectional, side view showing the portion where an accessory is mounted on the accessory shoe adapter of this invention.

Referring to FIG. 4, the convex portion 5 of the video light unit 4 has a pair of electric contacts 6 which extend through, from above to below, holes corresponding to the holes 12 of the adapter body so that the lower ends of the electric contacts 6 are in contact with the electric contacts 11 of the shoe portion 10, and the upper ends of the electric contacts 6 are in contact with conductors 7 provided along the inner surface of the video light unit. At the rear side of the convex portion 5 and in the bottom thereof there is provided a concave portion 9 into which the projection 18 of the spring 17 is fitted.

Figure 5A:
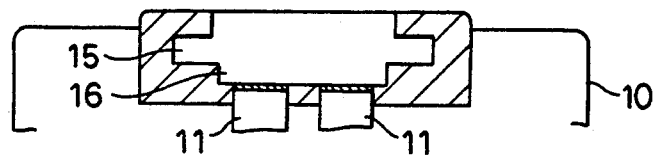
FIG. 5A is a sectional front view of the adapter body of the present invention.
Figure 5B:
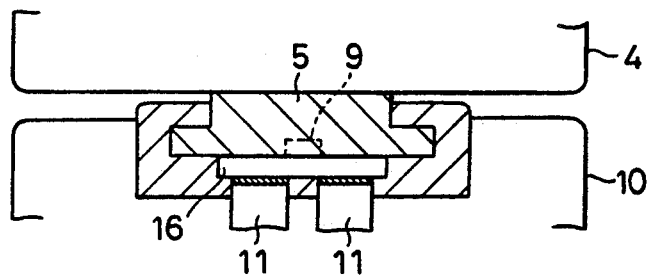
FIG. 5B is an enlarged sectional view of the portion where an accessory is mounted on the adapter.

Referring to FIGS. 3 and 5, the convex portion 5 at the bottom of the video light unit 4 serves as the portion to be attached to the accessory shoe adapter, and it is so configured as to fit into the dovetail 15 of the adapter body. Thus, to attach the video light unit 4 to the adapter body 1, the convex portion 5 is placed to fit into the dovetail 15, and the video light unit 4 is simply pushed horizontally from the rear side of the adapter toward the front end. At this point, the concave portion 9 at the bottom and at the rear side of the convex portion 5 firmly receives the projection 18 of the spring 17, as shown in FIG. 4, thereby preventing the mounted video light unit 4 from sliding off the adapter during use of the light unit. The electric contacts 6 of the light unit are moved along the guide groove 16 to be in contact with the electric contacts 11 of the shoe portion 10. To detach the light unit 4 from the adapter, the light unit is pushed horizontally from the forward end toward the rear of the adapter, upon which the projection 18 is pressed downwardly to allow the light unit to be easily removed.

In the described embodiment, the dovetail 15 is oriented from the rear to the forward end of the adapter. However, the dovetail may also be oriented from right to left or left to right of the adapter. In either case, the convex portion at the bottom of the accessory should also be configured in the same orientation as the dovetail to be engaged therewith.

As mentioned earlier in this description, the shoe portion of the adapter is dimensioned according to the Japanese Industrial Standard so that an accessory having no electric contacts can also be attached. The electric contacts 11 of the shoe portion 10 are located in the bottom of the guide groove 16 at a level one step lower than the surface where the convex portion of the accessory and the dovetail 15 fit with each other. This feature prevents occurrence of a short circuit and makes it possible to attach various accessories which do not require the use of a common supply source.

The camera mount 20 of the adapter is conventionally constructed to fit with the battery pack mount of commercially available video cameras so that it can be mounted to or detached from the battery pack mount of the video camera with one touch.

The battery pack mount 30 of the adapter body includes an upper end guide 25, a battery pack contacting wall 26, and a lower end guide 27, and a commercially available battery pack for the video camera can be fitted in and held by the upper end guide 25, the battery pack contacting wall 26, and the lower end guide 27, with one touch.

FIG. 2 is a rear view of the camera mount 20 of the adapter 1 to be mounted on the battery pack mount of the video camera, with the light unit 4 being mounted on the adapter 1.

The camera mount 20 has electric contacts 28, so as to be electrically connected to the battery pack when mounted on the battery pack mount of the video camera. The electric contacts 28 are connected to conductors 23 which extend through the camera mount 20.

FIG. 3 is a front view of the battery pack mount 30 of the adapter 1 to be fitted with the battery pack for the video camera, with the light unit 4 being mounted on the adapter 1.

The battery pack mount 30 has electric contacts 29 so as to be electrically connected to the commercially available battery pack for the video camera when the battery pack is mounted on the battery pack mount 30.

A circuit 40 for preventing super-discharge of the battery, which serves as a battery protection mechanism, is, as shown in FIG. 1, provided behind a cover 41 of the battery pack mount 30 (namely, inside of the adapter body 1).

Conductors 23 are connected to the electric contacts 29 of the battery pack mount 30 and are also connected to the electric contacts 11 of the shoe portion 10 through a switch 24 and the circuit 40 (see FIG. 6) by means of conductor means such as lead wires (not shown).

Accordingly, the mounted battery pack and the battery pack mount of the video camera are electrically connected through the electric contacts 29, conductors 23, and electric contacts 28.

According to the present invention, the video light unit can be run from a supply source (a battery) in common with the video camera body by attaching the adapter 1 of the present invention to the video camera body, mounting the battery pack, and attaching the video light unit to the shoe portion of the adapter 1. A switch (not shown) on the video camera body is then turned on, as is a switch 24, which is the power switch for the accessory and which is provided at the left side of the adapter 1, as shown in FIG. 2.

Figure 6:
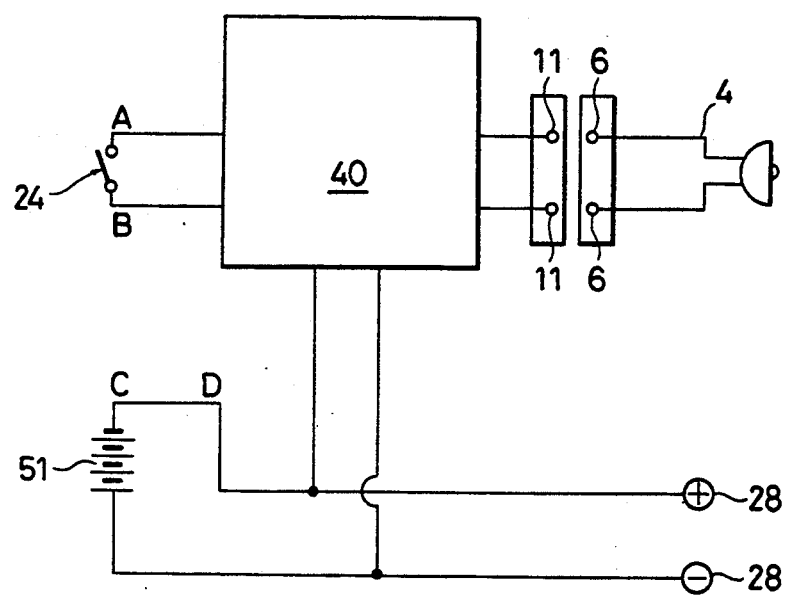
FIG. 6 is a schematic circuit diagram showing internal circuitry of the adapter of the present invention and connections to the video camera and the battery pack.

FIG. 6 shows a circuit arrangement of the accessory shoe adapter of the present invention, which is adapted so that it can use a supply source in common with the video camera.

A battery supply source 51 is connected in series with terminals (not shown) of the video camera body through terminals (contacts) 29, and the video camera is driven by closing and opening of the switch on the video camera body.

The supply source 51 and the circuit 40 (shown in block form) for preventing super-discharge of the battery and serving as the battery protection mechanism, are connected in parallel, and the circuit 40 is connected to terminals 6 of the accessory (the light unit) through the terminals 11. The mounted accessory can be operated by closing and opening of the switch 24 provided on the adapter (namely, lamp 8 of FIGS. 1 and 2 is lit upon closing of the switch 24). Accordingly, with the present invention, the mounted accessory and the video camera body use a common supply source.

The accessory shoe adapter of the present invention makes it possible to use a variety of types of accessories. In order to prevent accelerated consumption of the battery output or occurrence of some dangers in operating the accessory, which may possibly occur with some types of accessory, the adapter of the present invention includes the circuit 40 for preventing super-discharge of the battery. This circuit 40 for preventing super-discharge of the battery may be of conventional design.

In the circuit shown in FIG. 6, the switch 24 is provided between the points A and B. However, alternatively, it may be arranged between the points C and D to render the camera body and the accessory conductive at the same time.

As described above, the accessory shoe adapter of the present invention can be mounted to the battery pack mount of the video camera without causing any damage to the function of the video camera battery pack, and the adapter can be easily mounted with one touch, as is true in the case of mounting the battery pack on the video camera body. Thus, the adapter of the present invention is convenient and easy to handle.

Further, an accessory can be attached to the head of the adapter with one touch, so that the adapter allows both the camera body and the accessory to use a common supply source. This feature eliminates entanglement of the electric cord of the accessory and the necessity of changing the battery of the camera body and that of the accessory separately and at different times. With the present invention, the battery pack can be changed with a single touch.

Furthermore, with the use of the adapter of this invention, the necessity of having a battery or batteries housed in the accessory is eliminated, and, as a result, the accessory can be made smaller and lighter. Because of the simple construction of the accessory shoe adapter of the present invention, the adapter may be mass-produced, which, in turn, reduces manufacturing cost.

The accessory shoe adapter of the present invention meets the consumer's demand for using a plurality of accessories with a video camera. For example, the consumer may mount one accessory on the shoe portion of the adapter and connect another accessory to the threaded hole provided in the camera bottom for connection of a tripod.

The disclosure of Japanese Utility Model Application No. 1990-69068, laid open on 1-25-91, Gazette No. 2-92570, is incorporated fully herein by this reference.

What is claimed is:

1. An accessory shoe adapter for a video camera having a battery pack mount provided with a pair of contacts adapted to receive a battery pack to power said camera, said adapter comprising an adapter body having a front and a rear, and also having:
   a) a shoe portion for mounting an accessory;
   b) a camera mount formed on the front of said adapter body and adapted to be mounted on the battery pack mount of the video camera;
   c) a battery pack mount formed on the rear of said adapter body and adapted to receive the battery pack;
   d) a first pair of electric contacts in said shoe portion;
   e) a second pair of electric contacts on the camera mount of said adapter body corresponding to the electric contacts provided on the battery pack mount of the video camera;
   f) a third pair of electric contacts on the battery pack mount of said adapter body at locations corresponding to said second pair of electric contacts on said camera mount;
   g) means for electrically interconnecting said second and third pairs of electric contacts on said adapter body; and
   h) means for electrically interconnecting said third pair of electric contacts on the battery pack mount of said adapter body and said first pair of electric contacts in said shoe portion.

2. The accessory shoe adapter of claim 1, wherein said shoe portion includes a groove adapted to receive an accessory having a pair of contacts, and wherein said first pair of contacts in said shoe is located in said groove for engagement with the contacts of said accessory.

3. The accessory shoe adapter of claim 2, wherein said groove runs in a direction transverse to the front and rear of said adapter body so that, when an accessory is inserted in said groove, it slides transversely across said adapter body, along a line running from its back to its front, until the contacts of said accessory engage said first pair of contacts in said shoe.

4. The accessory shoe adapter of claim 1, wherein said camera mount and said battery pack mount are configured to present mutually complementary geometries.

5. The accessory shoe adapter of claim 1, wherein said shoe portion includes a surface for engaging an accessory and said first pair of contacts is recessed below said engaging surface to prevent said accessory from creating a short circuit between said first pair of contacts.

6. The accessory shoe adapter of claim 2 additionally including a battery protection circuit in said adapter body electrically connected between said second and third pairs of electric contacts.

7. The accessory shoe adapter of claim 6, wherein said battery protection circuit is connected through said third pair of electric contacts in parallel with said battery pack and is connected through said first pair of electric contacts to the contacts of said accessory.

8. The accessory shoe adapter of claim 1, wherein said second and third pairs of electric contacts are at corresponding locations on the front and rear of said adapter body respectively so as to allow commercially available video camera battery packs to be mounted on the battery pack mount on the rear of said adapter body.

9. The accessory shoe adapter of claim 2, wherein the adapter body has a head and said shoe portion is at said head.

* * * * *